United States Patent
Aggarwal et al.

(10) Patent No.: US 12,099,883 B1
(45) Date of Patent: Sep. 24, 2024

(54) SYSTEMS AND METHODS TO GENERATE MACHINE-EXECUTABLE PROGRAMS CONFIGURED TO PRESENT DATA IN CLOUD ENVIRONMENTS

(71) Applicant: EYGS LLP, London (GB)

(72) Inventors: Ajitabh Aggarwal, Haryana (IN); Naushad Mohammad, Hyderabad (IN); Pankaj Yadav, U.P. (IN)

(*) Notice: Subject to any disclaimer, the term of this patent is extended or adjusted under 35 U.S.C. 154(b) by 0 days.

(21) Appl. No.: 18/496,415

(22) Filed: Oct. 27, 2023

(51) Int. Cl.
*G06F 9/50* (2006.01)
*G06F 9/54* (2006.01)

(52) U.S. Cl.
CPC ............ *G06F 9/5072* (2013.01); *G06F 9/541* (2013.01)

(58) Field of Classification Search
CPC .............................. G06F 9/5072; G06F 9/541
See application file for complete search history.

(56) References Cited

U.S. PATENT DOCUMENTS

| | | | |
|---|---|---|---|
| 5,717,924 | A | 2/1998 | Kawai |
| 7,313,561 | B2 | 12/2007 | Lo et al. |
| 7,707,493 | B2 | 4/2010 | Vion-Dury et al. |
| 7,797,319 | B2 | 9/2010 | Piedmonte |
| 7,895,568 | B1 | 2/2011 | Goodwin et al. |
| 8,099,382 | B2 | 1/2012 | Liu et al. |
| 8,321,478 | B2 | 11/2012 | Fong |
| 8,412,746 | B2 | 4/2013 | Fox et al. |
| 8,612,468 | B2 | 12/2013 | Schloming |

(Continued)

FOREIGN PATENT DOCUMENTS

| | | |
|---|---|---|
| CA | 2429907 A1 | 11/2004 |
| CA | 2468406 A1 | 11/2004 |

(Continued)

OTHER PUBLICATIONS

Plummer, Julie.Implement a Custom Entity and Query Implementation Class. [online] (Mar. 9). SAP., pp. 1-8. Retrieved From the Internet <https://developers.sap.com/tutorials/abap-environment-a4c-create-custom-entity.html> (Year: 2023).*

(Continued)

*Primary Examiner* — Emerson C Puente
*Assistant Examiner* — Jonathan R Labud
(74) *Attorney, Agent, or Firm* — COOLEY LLP

(57) ABSTRACT

A method includes receiving, via a processor, first programming code associated with a legacy report that includes user-configurable data. Based on the first programming code, second programming code associated with a first function that outputs an indication of the user-configurable data is generated, as is third programming code associated with a second function that is configured to (1) receive a user input from a cloud-based application and (2) send the user-configurable data to the cloud-based application. Entity data is generated based on the second programming code, query data is generated based on the third programming code, and service data is generated based on the second programming code and the third programming code. The processor then generates fourth programming code that is associated with the cloud-based application and is configured to generate a cloud-based report that includes the user-configurable data.

20 Claims, 7 Drawing Sheets

(56) References Cited

U.S. PATENT DOCUMENTS

| | | |
|---|---|---|
| 9,244,706 B2 | 1/2016 | Calev et al. |
| 9,652,478 B2 | 5/2017 | Gupta |
| 10,140,100 B2 | 11/2018 | Barnes et al. |
| 10,242,016 B2 | 3/2019 | Gorelik |
| 10,324,908 B2 | 6/2019 | Kumar et al. |
| 10,545,958 B2 | 1/2020 | Azzam et al. |
| 10,862,979 B2 | 12/2020 | Deraz et al. |
| 10,983,969 B2 | 4/2021 | Krishnan et al. |
| 11,138,206 B2 | 10/2021 | Siebeking et al. |
| 11,163,762 B2 | 11/2021 | Arnold et al. |
| 11,200,037 B1 | 12/2021 | Mann et al. |
| 11,409,802 B2 | 8/2022 | Miranker et al. |
| 11,520,565 B2 | 12/2022 | Langdon |
| 2003/0131144 A1 | 7/2003 | Weaver |
| 2004/0181538 A1 | 9/2004 | Lo et al. |
| 2005/0234889 A1 | 10/2005 | Fox et al. |
| 2006/0085451 A1 | 4/2006 | Pal et al. |
| 2006/0200438 A1 | 9/2006 | Schloming |
| 2007/0276787 A1 | 11/2007 | Piedmonte |
| 2008/0120316 A1 | 5/2008 | Vion-Dury et al. |
| 2008/0256121 A1 | 10/2008 | Liu et al. |
| 2008/0320023 A1 | 12/2008 | Fong |
| 2011/0296373 A1 | 12/2011 | Calev et al. |
| 2012/0095957 A1 | 4/2012 | Reddy et al. |
| 2015/0347472 A1 | 12/2015 | Gupta |
| 2016/0342597 A1 | 11/2016 | Azzam et al. |
| 2017/0060894 A1 | 3/2017 | Gorelik |
| 2017/0255452 A1 | 9/2017 | Barnes et al. |
| 2018/0060366 A1 | 3/2018 | Kumar et al. |
| 2018/0295194 A1 | 10/2018 | Deraz et al. |
| 2019/0065014 A1* | 2/2019 | Richter ............... G06T 11/60 |
| 2019/0391825 A1* | 12/2019 | Jann ................. G06F 3/0482 |
| 2020/0004891 A1* | 1/2020 | Kumar ................. G06N 20/00 |
| 2020/0201865 A1 | 6/2020 | Siebeking et al. |
| 2020/0265025 A1 | 8/2020 | Krishnan et al. |
| 2021/0019310 A1 | 1/2021 | Arnold et al. |
| 2021/0109720 A1 | 4/2021 | Langdon |
| 2021/0224330 A1 | 7/2021 | Miranker et al. |
| 2022/0248296 A1* | 8/2022 | Merwaday ............ H04W 36/30 |

FOREIGN PATENT DOCUMENTS

| | | |
|---|---|---|
| CA | 2636091 A1 | 7/2007 |
| CA | 2645715 A1 | 11/2007 |
| EP | 1482430 A2 | 12/2004 |
| EP | 1515251 A1 | 3/2005 |
| EP | 2008206 A1 | 12/2008 |
| WO | WO-2008085821 A2 | 7/2008 |

OTHER PUBLICATIONS

ABS Team, "ABS Team ReportingEnabler for SAP Fiori: ABAP reports in the Fiori context," ABS Team GmbH Annual Congress, 2023, 2 pages.

ABS Team, "ABS Team ReportingEnabler for SAP Fioro," ABS Team GmbH, Jul. 2018, 2 pages, available online at https://d2uars7xkdmztq.cloudfront.net/app_resources/29092/documentation/89044_en.pdf.

ABS Team, "Extensive and Proven ABAP Reporting in SAP Fioro," ABS Team GmbH, 2023, 5 pages, available online at https://store.sap.com/dcp/en/product/display-0000029092_live_v1/abs-team-reportingenabler-for-sap-fiori.

SAP, "Architecture and Development Guide for Industry Cloud Solutions—User Interface and User Experience," SAP Business Technology Platform (SAP BTP) Cloud, 2023, 3 pages, available online at https://help.sap.com/http.svc/pdfdownload?id=03913982555280682.

Github, "Implement a Custom Entity and Query Implementation Class," created by user JuliePlummer20, Oct. 2023, 10 pages, retrieved from the Internet: https://github.com/sap-tutorials/abap-core-development/blob/363a039764a55ddce590c0be53c66d89ca20425f/tutorials/abap-environment-a4c-create-custom-entity/abap-environment-a4c-create-custom-entity.md.

* cited by examiner

SYSTEMS AND METHODS TO GENERATE MACHINE-EXECUTABLE PROGRAMS CONFIGURED TO PRESENT DATA IN CLOUD ENVIRONMENTS

FIELD

One or more embodiments described herein relate to systems and computerized methods for generating machine-executable programs configured to present data in cloud environments.

BACKGROUND

Machine-executable programs can be executed locally (e.g., on-premises) or remotely (e.g., via a cloud-based network). It can be difficult to execute some on-premises machine-executable programs remotely if those programs are configured to be executed locally. As such, it can be desirable to have systems configured to automatically generate a cloud-associated program that can perform at least one function of an on-premises program.

SUMMARY

In an embodiment, a method includes receiving, at a processor, executable code configured to generate first data that includes a first selection of second data based on a first user input. The method also includes generating, via the processor, in response to the receiving, and based on the executable code, (1) first function code that is associated with a first function and that is configured to generate third data that defines at least one field category, and (2) second function code that is associated with a second function and that is configured to populate at least a portion of the second data in the at least one field category. The method also includes generating, via the processor and in response to the generating the first function code, fourth data based on a first call to the first function code, the fourth data representing an entity that includes the second data and the third data. The method also includes generating, via the processor and in response to the generating the second function code, fifth data based on the second function code, the fifth data configured to define an application programming interface (API) that is configured to allow access to the fourth data by a cloud-based application in response to a second call to the second function code. The method also includes generating, via the processor and in response to the generating the fifth data, the cloud-based application. The cloud-based application is configured to, in response to a second user input, (1) use the API to automatically generate source code configured to generate a second call to the second function code, (2) execute the source code to retrieve a portion of the fourth data associated with a second selection of the second data, and (3) generate sixth data that includes the portion of the fourth data.

DETAILED DESCRIPTION

Figure 1:
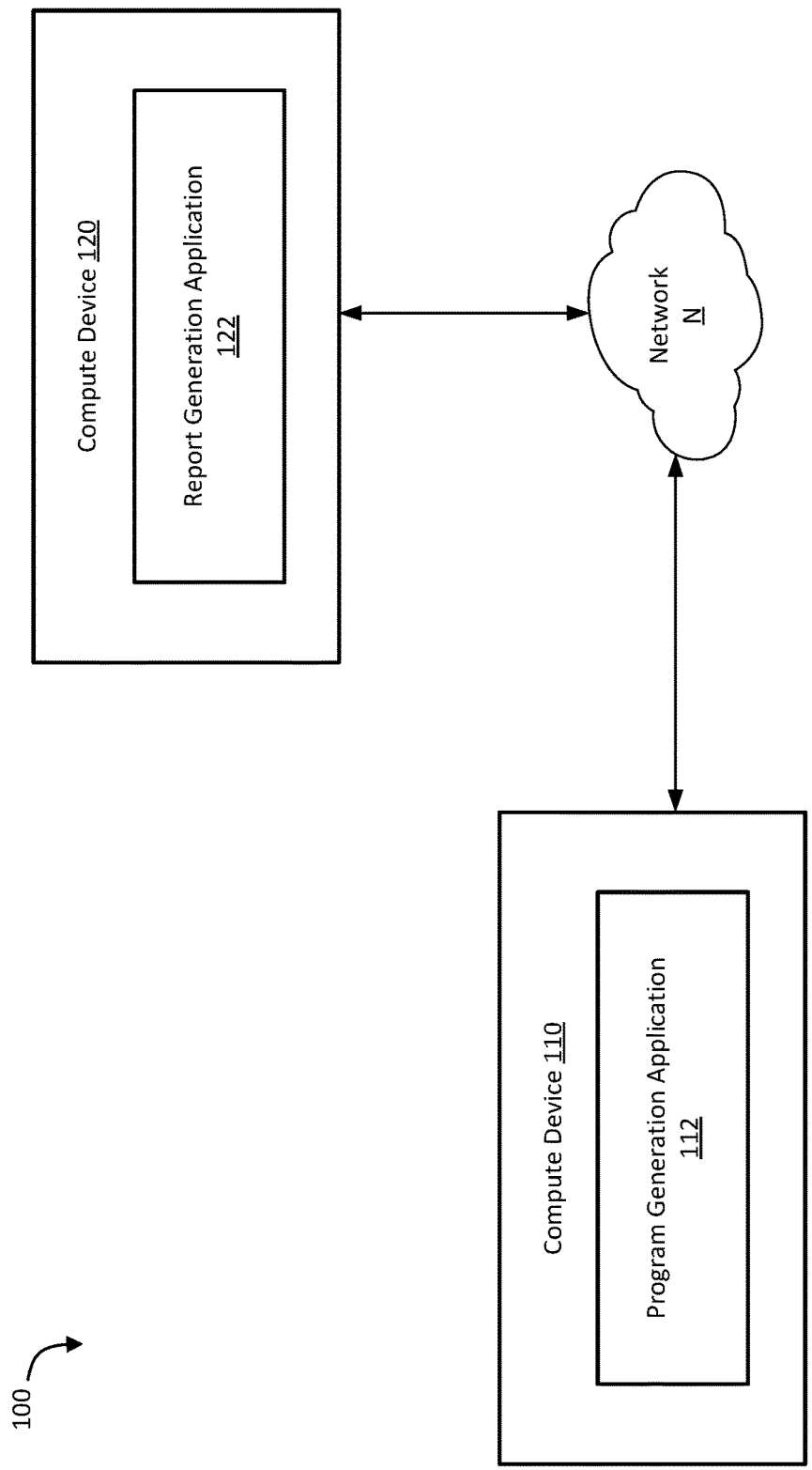
FIG. 1 is a schematic diagram of a program generation system, according to an embodiment.

FIG. 1 is a schematic diagram of a program generation system 100, also referred to herein as "a system," for generating programs (e.g., cloud-based programs/applications) configured to be executed at remote locations (e.g., on the cloud, on a remote server, off-premises, and/or the like), according to an embodiment. The program generation system 100 includes compute devices 110-120, which are communicatively coupled via a network N.

The compute devices 110-120 can include, for example, a hardware-based computing device, a multimedia device, or a cloud-based device. Examples of such devices include, for example, a computer device, a server, a desktop compute device, a laptop, a smartphone, a tablet, a wearable device, a remote computing infrastructure, and/or the like. In some implementations, as shown in FIG. 1, the compute device 110 can be configured to execute (e.g., via a processor) the program generation application 112 to generate a cloud-based application. The cloud-based application (e.g., the report generation application 122) can be generated from a legacy output (not shown in FIG. 1; e.g., a legacy report and/or presentation of data, associated with an on-premises database and not associated with a cloud environment). The compute device 120 can be configured to execute (e.g., via a processor) the report generation application 122 to generate a cloud-based report based on the legacy report, as described herein. The report generation application 122 can be a program generated by the program generation application 112. In some implementations, the compute device 110 can be disposed in a different location than the compute device 120. For example, the compute device 110 can be located remotely and/or off-premises as to the compute device 120. Although not shown in FIG. 1, in some implementations, the compute device 110 can be configured to execute the program generation application 112 and the report generation application 122, and/or the compute device 120 can be configured to execute the program generation application 112 and the report generation application 122. In some implementations, the report generation system 100 can include a compute device(s) in addition to the compute devices 110-120, and such a compute device(s) can be configured to execute instances of the program generation application 112 and/or the report generation application 122.

Figure 2:
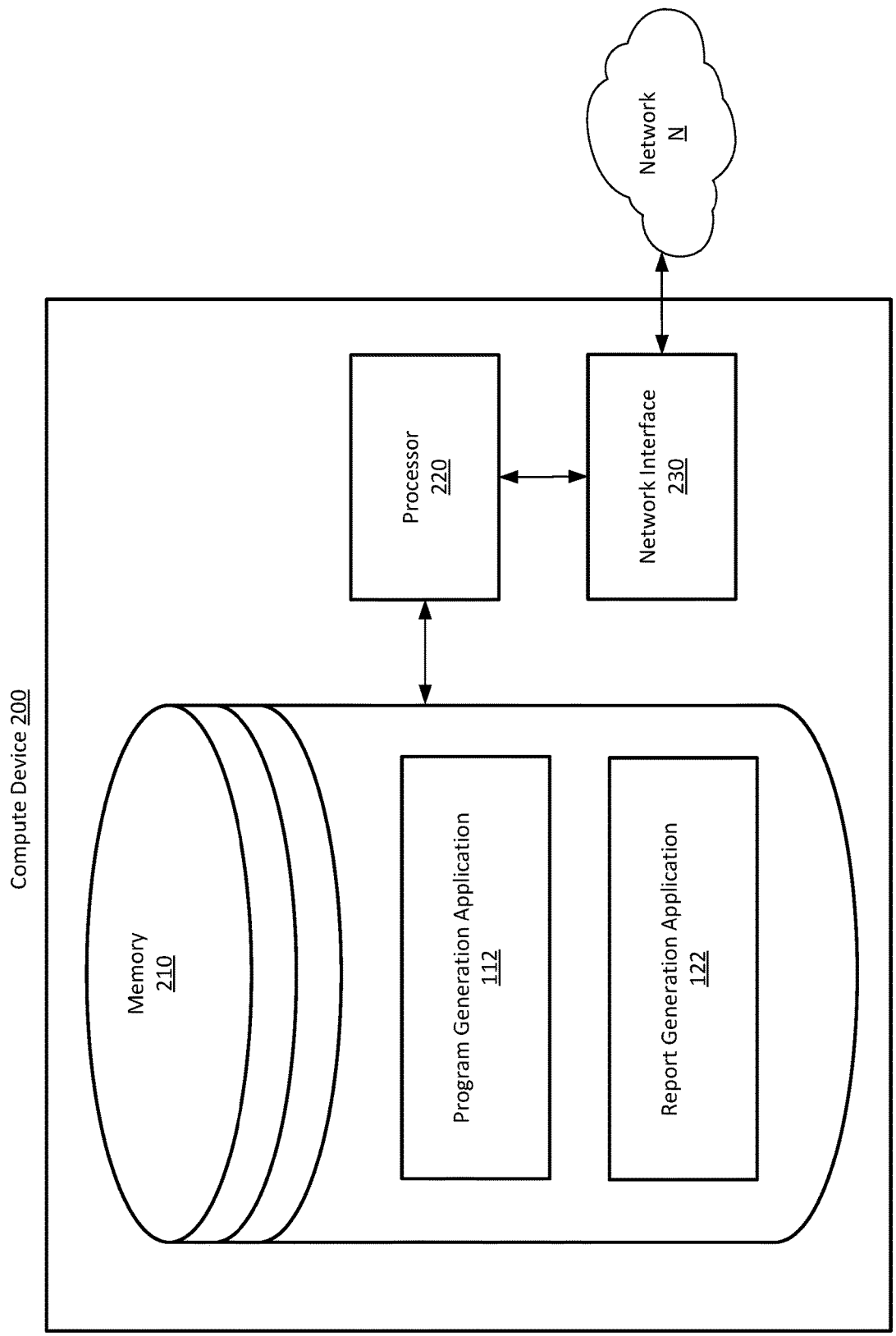
FIG. 2 is a schematic diagram of a compute device included in a program generation system, according to an embodiment.

FIG. 2 is a schematic diagram of a compute device 200 from the schema generation system 100 shown in FIG. 1, according to an embodiment. The compute device 200 can be structurally and/or functionally similar to the compute device 110 and/or the compute device 120 of FIG. 1. The compute device 200 can be a hardware-based computing device, a multimedia device, or a cloud-based device; examples of such a device include, for example, a computer device, a server, a desktop compute device, a laptop, a smartphone, a tablet, a wearable device, a remote computing infrastructure, and/or the like. The compute device 200 can include a memory 210, a processor 220, and a network interface 230 configured to interface with a network N.

The processor 220 can be, for example, a hardware based integrated circuit (IC), or any other suitable processing device configured to run and/or execute a set of instructions or code. For example, the processor 220 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a remote cluster of one or more processors associated with a cloud-based computing infrastructure and/or the like. The processor 220 is operatively coupled to the memory 210 (described herein). In some embodiments, for example, the processor 220 can be coupled to the memory 210 through a system bus (for example, address bus, data bus and/or control bus).

The memory 210 can be, for example, a random-access memory (RAM), a memory buffer, a hard drive, a read-only memory (ROM), an erasable programmable read-only memory (EPROM), and/or the like. The memory 210 can store, for example, one or more software modules and/or code that can include instructions to cause the processor 220 to perform one or more processes, functions, and/or the like (e.g., those associated with the program generation application 112 and/or the report generation application 122, as described herein). In some implementations, the memory 210 can be a portable memory (e.g., a flash drive, a portable hard disk, and/or the like) that can be operatively coupled to the processor 220. In some implementations, the memory 210 can be remotely operatively coupled with the compute device 110, for example, via the network interface 230. For example, a remote database server (now shown) can be operatively coupled to the compute device 110.

In some implementations, as shown in FIG. 2, the memory 210 can include the program generation application 112 and the report generation application 122. In some alternative embodiments, the memory can exclude one of the program generation application 112 or the report generation application 122. The program generation application 112 and the report generation application 122 can each include software code stored in the memory 210 and executable by the processor 220. In some implementations, the program generation application 112 and the report generation application 122 can include hardware components. In some alternative embodiments, the program generation application 112 and/or the report generation application 122 can be included in a memory that is operatively connected to the compute device 200 (e.g., via a network N, as described herein) rather than in memory 210.

As described herein, the program generation application 112 can be configured to generate a program (e.g., an application to be executed via a processor, such as the report generation application 122 and/or the like). Such a program generated by the program generation application 112 can be configured to, for example, generate a report (e.g., a presentation of data). In some instances, the program generation application 112 can generate programs configured to generate a cloud-based report based on a legacy report.

The network interface 230 can include one or more network interface controllers. These one or more network interface controllers can be one or more I/O (i.e., input/output) devices that are configured to transfer data to and/or from the processor 220 (e.g., via one or more buses supported by the processor 220). The one or more network interface controllers can be further configured to transfer the data to and/or from a network 240 that includes, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. The one or more network interface controllers can be configured based on one or more network protocols, such as Ethernet®, Infiniband®, optical-based protocols, SONET, and 802.11. In some instances, the one or more network interface controllers 240 can be configured to support a network storage protocol, such as, for example, Internet Small Computer Systems Interface (iSCSI), Fibre Channel (FC), Fibre Channel over Ethernet (FCOE), Network File System (NFS) or Server Message Block (SMB). In some instances, the one or more network interface controllers can include, for example, a network interface card (NIC), a Wi-Fi™ module, a Bluetooth® module and/or any other suitable wired and/or wireless communication device.

In some instances, the network interface 230 can facilitate receiving and/or transmitting data, including data associated with a cloud-native application and/or an on-premises application. For example, the network interface 230 can be configured to receive a series of user inputs (e.g., via the cloud-based user interface 402 of FIG. 4). Alternatively or in addition, the network interface 230 can be configured to send and/or retrieve data associated with a legacy report via a backing service (e.g., an API, such as a Representational State Transfer (RESTful) API).

Figure 3:
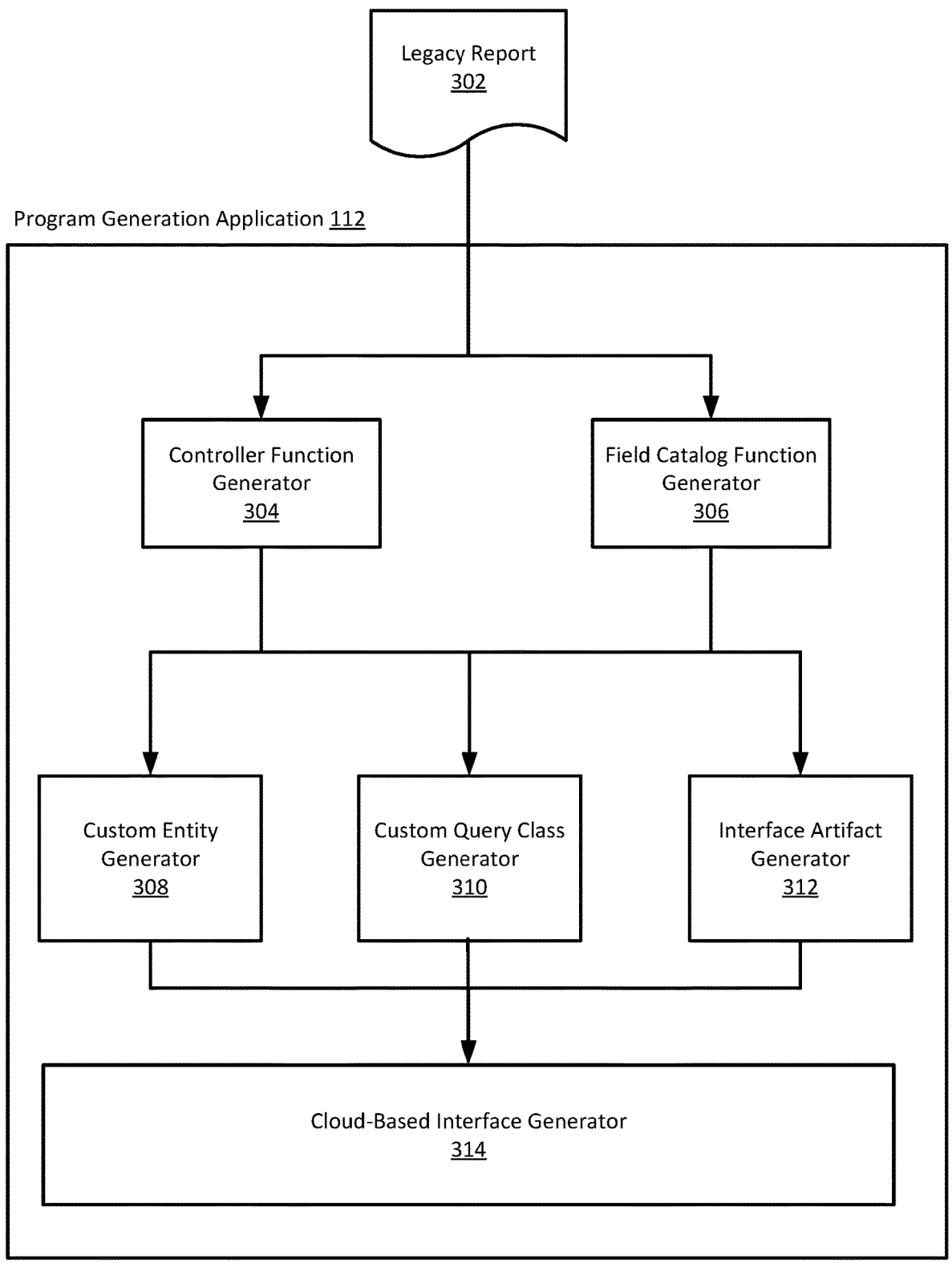
FIG. 3 is a schematic diagram of a program generation application included in a program generation system, according to an embodiment.

FIG. 3 shows a schematic diagram of a program generation application 112 included in a program generation system (e.g., the program generation system 100 of FIG. 1), according to an embodiment. The program generation application 112 can be configured, for example, to generate programs (e.g., the report generation application 122) based on legacy reports, such as the legacy report 302. The generated program can be configured, for example, to generate reports via a cloud-based interface based on the legacy report used to generate the program. The program generation application 112 includes a controller function generator 304, a field catalog function generator 306, a custom entity generator 308, a custom query class generator 310, an interface artifact generator 312, and a cloud-based interface generator 314.

The legacy report 302 can be, by way of example only, an SAP® graphical user interface (GUI) based ABAP report. The program generation application 112 can be configured to convert the legacy report 302 to a cloud-native report. A cloud-native report can include, by way of example only, an SAP Fiori® list report. In some implementations, the legacy report 302 can be associated with an SAP enterprise resource planning (ERP) information technology (IT) landscape. The legacy report 302 can include a custom (as to the enterprise) GUI-based SAP® report, where the report is built using SAP standard ABAP objects. In some instances, these SAP® standard ABAP objects can be unavailable in a cloud-based environment, such as the SAP® Business Technology Platform (BTP) ABAP environment. As a result, in some instances, the legacy report 302 can be deemed retired and/or ineligible for a "Lift and Shift" (e.g., a migration) to an ABAP BTP cloud environment. In some instances, access to the legacy report 302 can be limited or excluded based on, for example, system and/or security requirements. In some instances, the legacy report 302 cannot be executed via a remote compute device (e.g., a cloud-based compute device).

In some instances, BTP can have limited or no capability to use low-code no-code (LCNC) methods to build apps through the consumption of on-premises legacy code. LCNC can include methods of designing and developing apps using drag and drop tools that reduce or eliminate the need for human-written code. In some implementations, the program generation application 112 can be configured to use LCNC methods (e.g., using bots/automated code generation techniques) to generate programs. As a result of using the program generation application 112 to convert the legacy report 302, an enterprise can continue to use existing software-based capabilities without significantly compromising the enterprise's IT landscape.

Using the legacy report 302 as input, the program generation application 112 can be configured to generate remote-enabled (e.g., via remote function calls (RFC)) function modules. The program generation application 112 can use the controller function generator 304 to generate a first function module (e.g., function code) and the field catalog function generator 306 to generate a second function module. The controller function generator 304 can analyze the legacy report 302 to identify input/output parameter control. An input/output parameter can be configured to receive data and/or send data in response to received data. The field catalog function generator 306 can be configured to determine custom entity data used by a cloud-based environment (e.g., a BTP environment) to generate cloud reports. The custom entity data can include field data that can be used to classify/categorize data to be included in a cloud report. For example, the entity data can include data stored in a database and representative of, for example, a person, place, thing, event, etc. Said differently, entity data can include stored information (e.g., attributes, records, etc.) associated with a person, organization, object type, concept, etc.

The controller function generator 304 can be configured to generate an input/output controller (e.g., the controller function 406 of FIG. 4) that can receive user input from a cloud-based interface/application (e.g., a cloud Fiori application) and send data to the interface/application. The field catalog function generator 306 can be configured to generate a function (e.g., the field catalog function 410 of FIG. 4) that can provide data to a code generation framework (e.g., ABAP RESTful Application Programming Model (RAP)) for building cloud-ready applications. Specifically, this function can generate technical fields (e.g., categories) that are associated with the legacy report 302. In some implementations, the functions generated by the controller function generator 304 and the catalog function generator 306 can be associated with a cloud connector remote function call that interfaces with a BTP administrative cockpit sub-account.

The program generation application 112 can be configured to run a RESTful application programming model in a target cloud-based environment (e.g., an SAP® BTP environment) to generate a data model, a service definition, and/or a service binding. The data model, service definition, and/or the service binding can be generated using the remote function modules generated by the controller function generator 304 and the field catalog function generator 306.

The data model can be generated using the custom entity generator 308 and the custom query class generator 310. These generators can each include, for example, ABAP Extension Components (XCO) libraries, which can be configured to generate, for example, the custom entity 412 and the custom query class 414 of FIG. 4. ABAP XCO libraries can be further included in the interface artifact generator 312, which can be configured to generate, for example, service data (e.g., RESTful programming artifacts), as discussed herein. The ABAP XCO libraries can include a list of SAP® standard objects that can be used to generate ABAP objects in a BTP ABAP Cloud system. For example, an XCO_CP_ABAP DICTIONARY standard object can be used to generate a technical field in a custom entity (e.g., the custom entity 412 of FIG. 4). The program generation application 112 can be configured to further use ABAP XCO libraries to automatically create at least one transport request and/or at least one ABAP package, that are configured to save objects generated by the program generation application 112. In some implementations, as a result of an error occurring during the generation of objects via the program generation application 112, the program generation application 112 can stop execution and report an indication of the error to a user. During a subsequent execution of the program generation application 112, a generated objects can be overwritten based on an associated namespace used for the initial execution of the program generation application 112.

The custom query class generator 310 can be configured to define a custom query by generating associated data. This data can include at least one custom query class. The custom query class can be configured to facilitate a request(s) and/or a response(s) from a frontend application (e.g., an SAP Fiori® frontend application and/or the cloud-based user interface 402 of FIG. 4). The custom query class generator 310 can be configured to dynamically generate source code using a function generated by the controller function generator 304 and in response to receiving a request from the frontend application.

The cloud-based interface generator 314 can be configured to generate a cloud-based user interface (e.g., the cloud-based user interface 402, a Fiori report interface, and/or a Fiori tile). The cloud-based interface generator 314 can include robotic process automation (RPA) tools (e.g., SWIFT) to initiate a sequence of development steps automatically and using generate service binding data generated by the interface artifact generator 312. The cloud-based interface generator 314 can use annotations associated with the custom entity generated by the custom entity generator 308 to implement selection and/or filtering criteria. The selection and/or filtering criteria can implement selection and/or filtering functionality that is equivalent, substantially equivalent, similar, or substantially similar to selection and/or filtering functionality associated with the legacy report 302. In some implementations, the cloud-based interface generator 314 can use SAP® Business Application Studio (BAS), Launchpad services, and/or SAP® Build Work Zone to generate a frontend application. For example, the generated frontend application can be deployed in a BTP subaccount, and Launchpad services can be used to configure a SAP Fiori® tile.

The cloud-based interface generator 314 can be configured to perform steps that differ from what would/could be performed manually (e.g., by a human). For example, the cloud-based interface generator 314 can be configured to automatically generate (e.g., without human intervention) custom software components (e.g., the controller function generator 304, the field catalog function generator 306, the custom entity generator 308, the custom query class generator 310, and/or the interface artifact generator 312).

Figure 4:
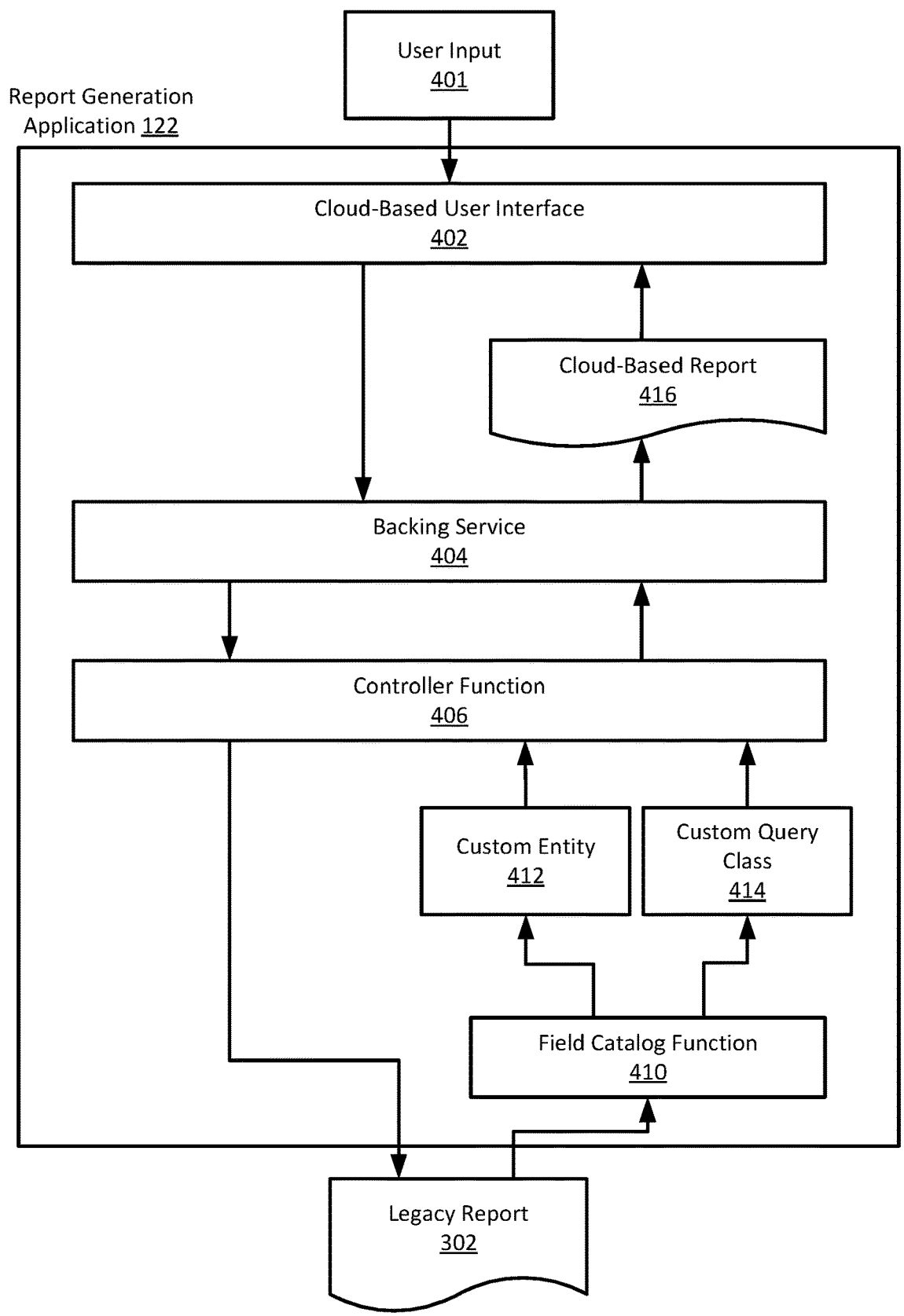
FIG. 4 is a schematic diagram of a report generation application included in a program generation system, according to an embodiment.

These custom software components can be configured to dynamically translate cloud-based user requests to interact with a legacy report stored at a remote compute device, as shown in FIG. 4. In some implementations, a custom software component(s) can be associated with a different programming language than a remaining custom software component(s). The custom software component(s) can be generated more quickly using the cloud-based interface generator 314 than by a manual process. As a result, the automated process implemented by the cloud-based interface generator 314, compared to a manual process, can facilitate remote access to an increased number of legacy outputs with increased efficiency.

FIG. 4 is a schematic diagram of the report generation application 122 included in a program generation system, according to an embodiment. The report generation application 122 can be configured to generate and/or display cloud-based reports based on legacy reports, such as the legacy report 302. The report generation application 122 can be generated by the program generation application 112. The report generation application 122 includes a cloud-based user interface 402, a backing service agent 404, a controller function 406, a field catalog function 410, a custom entity 412, a custom query class 414, and a cloud-based report 416.

The cloud-based user interface 402 can include a user interface (e.g., a graphical user interface) configured to receive at least one user input 401 from a user. The user input 401 can include, for example, a selection of data that the user desires to be presented in a report. In some implementations, the cloud-based user interface 402 can provide the user with a user experience across enterprise applications (e.g., legacy, new, and/or cloud-based applications) across different types of compute devices, such as desktop computers and mobile computing devices (e.g., laptop computers, tablet computers, notebook computers, personal digital assistants (PDAs), smartphones, mobile phones, smart watches, etc.), and across one or more deployment options (e.g., on-premises, cloud, as-a-service, etc.). In some implementations, the cloud-based user interface 402 can be associated with a SAP Fiori® user experience (UX) and can include at least one SAP Fiori® tile.

In response to receiving the at least one input from the user, the cloud-based user interface 402 can be configured to automatically generate at least one function call to the controller function 406 via the backing service agent 404. The backing service agent 404 can be configured to generate service data. This service data can include, for example, data configured to permit an application (e.g., the report generation application 122) to use an external and/or supporting application, database, or other service. The service data can be associated with a credential(s), a connection detail(s), a volume mount(s), a secret(s), etc. The backing service agent 404 can include, for example, a RESTful API or any other interface suitable for exchanging data over a network. In some implementations, the backing service agent 404 can include at least one service definition and/or at least one service binding, associated with an OData protocol. The cloud-based user interface 402 can interact with the service binding (e.g., RESTful OData), which can in turn interact with the controller function 406 to retrieve data of interest (e.g., business/enterprise data included in the legacy report 302). In some instances, the data of interest can be stored in a memory (e.g., an on-premises memory) that is not associated with a cloud environment. This data of interest can be organized/structured, for example, within a data structure, a data object, and/or a collection of data (e.g., a database entity, such as the custom entity 412) that includes one or more characteristics (e.g., attributes). The field catalog function 410 can be configured to associate/organize the data of interest with one or more fields (e.g., categories) to be included in the generated cloud-based report 416. The report generation application 122 can use the custom query class 414, generated by the custom query class generator 310 of FIG. 3, to facilitate a search and/or retrieval of data based on a search/retrieval request from a user.

The controller function 406 can be configured to transmit the data of interest from the memory associated with the legacy report 302 to the cloud-based report 416 via the backing service agent 404. The cloud-based report 416 can include, for example, an SAP Fiori® list report and can be configured to present data in a cloud environment. The cloud-based report 416 can include the data of interest that was request by the user via the cloud-based user interface 402. The cloud-based user interface 402 can be configured to display the cloud-based report 416 to the user.

Figure 5:
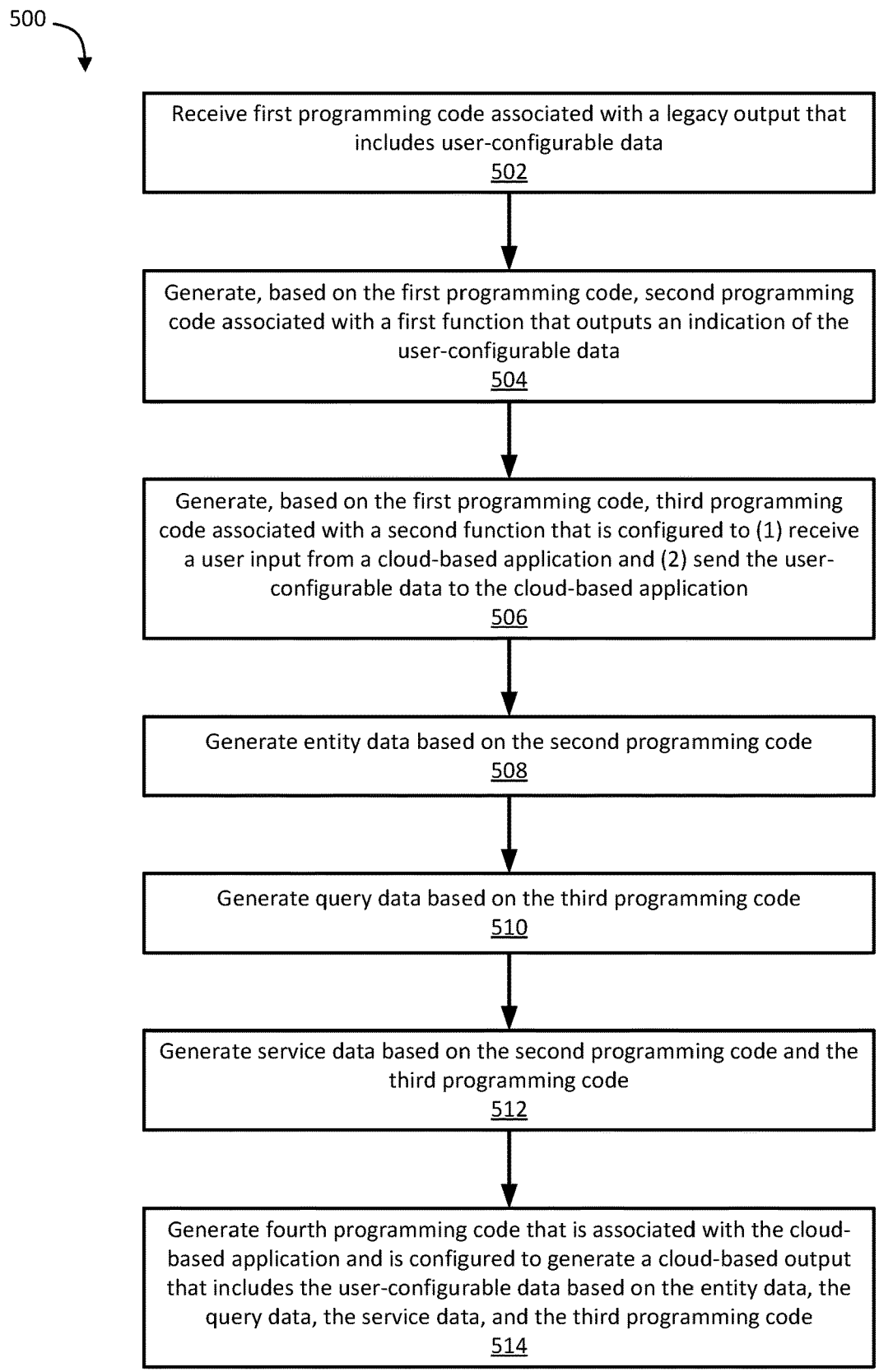
FIG. 5 is a flowchart showing a method of using a program generation system to generate code associated with a cloud-based application configured to generate a cloud-based output, according to an embodiment.

FIG. 5 is a flowchart showing a method 500 illustrating an example implementation using a program generation system to generate code associated with a cloud-based application configured to generate a cloud-based output, according to an embodiment. The method 500 can be implemented by a program generation system described herein (e.g., the program generation system 100 of FIG. 1). Portions of the method 500 can be implemented using a processor (e.g., the processor 220 of FIG. 2) of any suitable compute device (e.g., the compute device 110 and/or 120 of FIG. 1). The method 500 can include a method of generating a report generation program.

The method 500 at 502 includes receiving, at a processor, first programming code associated with a legacy output that include user-configurable data. The first programming code can be, for example, the legacy report 302 of FIG. 3 and/or FIG. 4. In some implementations, the first programming code can be associated with, by way of example only, SAP® Advanced Business Application Programming (ABAP). At 504, as a result of the receiving at 502, the processor generates second programming code associated with a first function that outputs an indication of the user-configurable data. The processor generates the second programming code based on the first programming code. The second programming code can include, for example, the field catalog function 410 of FIG. 4, which, in some implementations, can be generated by the field catalog function generator 306 of FIG. 3. At 506, the method 500 includes generating, via the processor and based on the first programming code received at 502, third programming code associated with a second function that is configured to (1) receive a user input from a cloud-based application and (2) send the user-configurable data to the cloud-based application. The third programming code can include, for example, the controller function 406 of FIG. 4. which can be generated by, for example, the controller function generator 304 of FIG. 3.

The method 500 at 508 includes generating entity data based on the second programming code. The entity data can be associated with, for example, the custom entity 412 of FIG. 4, which can be generated by the custom entity generator 308 of FIG. 3 automatically and without human intervention. The entity data can be generated using the second programming code and the third programming code. At 510, the processor generates query data based on the third programming code. The query data can include, for example, the custom query 414, which can be generated by the custom query class generator 310 of FIG. 3. At 512, the processor generates service data based on the second programming code and the third programming code. The service data can include, for example, the backing service 404 of FIG. 4, which can be generated by the interface artifact generator 312 of FIG. 3. The service data can also include, for example, an API, as described herein. At 514, the method includes generating fourth programming code that is associated with the cloud-based application and is configured to generate a cloud-based output that includes the user-configurable data based on the entity data, the query data, the service data, and the third programming code. The fourth programming code can include, for example, the cloud-based user interface 402 of FIG. 4, which can be configured to cause generation and display of the cloud-based report 416 of FIG. 4. The fourth programming code can be generated by the cloud-based interface generator 314 of FIG. 3.

Figure 6:
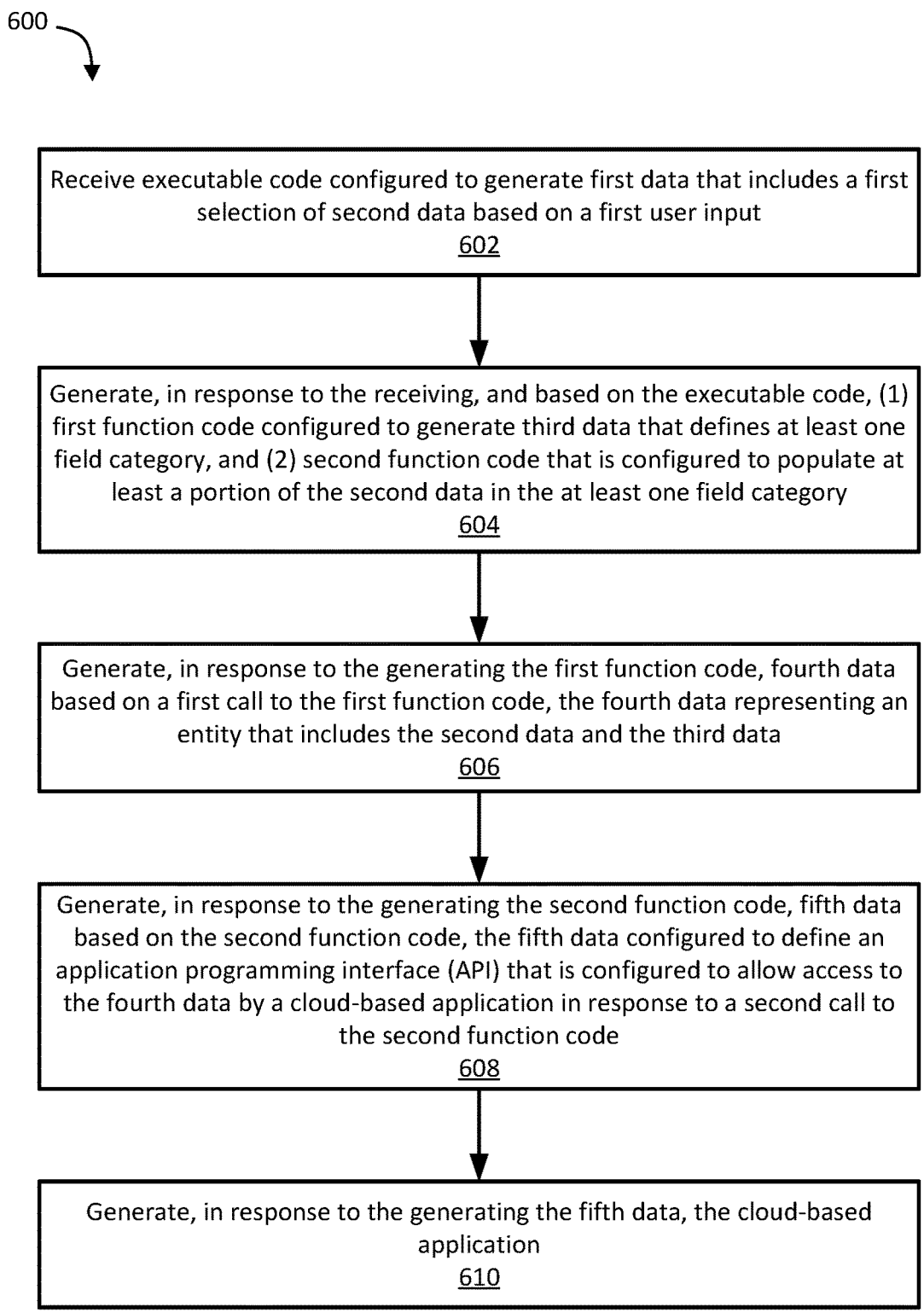
FIG. 6 is a flowchart showing a method of using a program generation system to generate a cloud-based application based on executable code configured to accept a user input to select data, according to an embodiment.

FIG. 6 is a flowchart showing a method 600 illustrating an example implementation using a program generation system to generate a cloud-based application based on executable code configured to accept a user input to select data, according to an embodiment. The method 600 can be implemented by a program generation system described herein (e.g., the program generation system 100 of FIG. 1). Portions of the method 600 can be implemented using a processor (e.g., the processor 220 of FIG. 2) of any suitable compute device (e.g., the compute device 110 and/or 120 of FIG. 1). The method 600 can include a method of generating a report generation program.

At 602, the method 600 includes receiving, via a processor, executable code configured to generate first data that includes a first selection of second data based on a first user input. The first data can include an output (e.g., the legacy report 302 of FIG. 3 or FIG. 4) that includes a selection of data from the second data, where the second data can be, by way of example only, a repository of organizational data. A user can select data from the repository to include in the output based on the user input. The executable code can be, for example, associated with ABAP, as described herein. At 604, in response to the receiving at 602, the processor generates, automatically and without human intervention, (1) first function code configured to generate third data that defines at least one field category, and (2) second function code that is configured to populate at least a portion of the second data in the at least one field category. The generating is based on the executable code. The first function code can be, for example, the field catalog function 410 of FIG. 4, and the second function code can be, for example, the controller function 406 of FIG. 4.

At 606, the method 600 includes generating, in response to the generating the first function code, fourth data based on a first call to the first function code, the fourth data representing an entity that includes the second data and the third data. The fourth data can include the custom entity 412 of FIG. 4. At 608, the processor generates, in response to the generating the second function code, fifth data based on the second function code, the fifth data configured to define an application programming interface (API) that is configured to allow access to the fourth data by a cloud-based application in response to a second call to the second function code. The fifth data can include, for example, the backing service 404 of FIG. 4. At 610, and in response to the generating performed at 608, the processor can generate the cloud-based application. The cloud-based application can include, for example, the cloud-based user interface 402 of FIG. 4.

Figure 7:
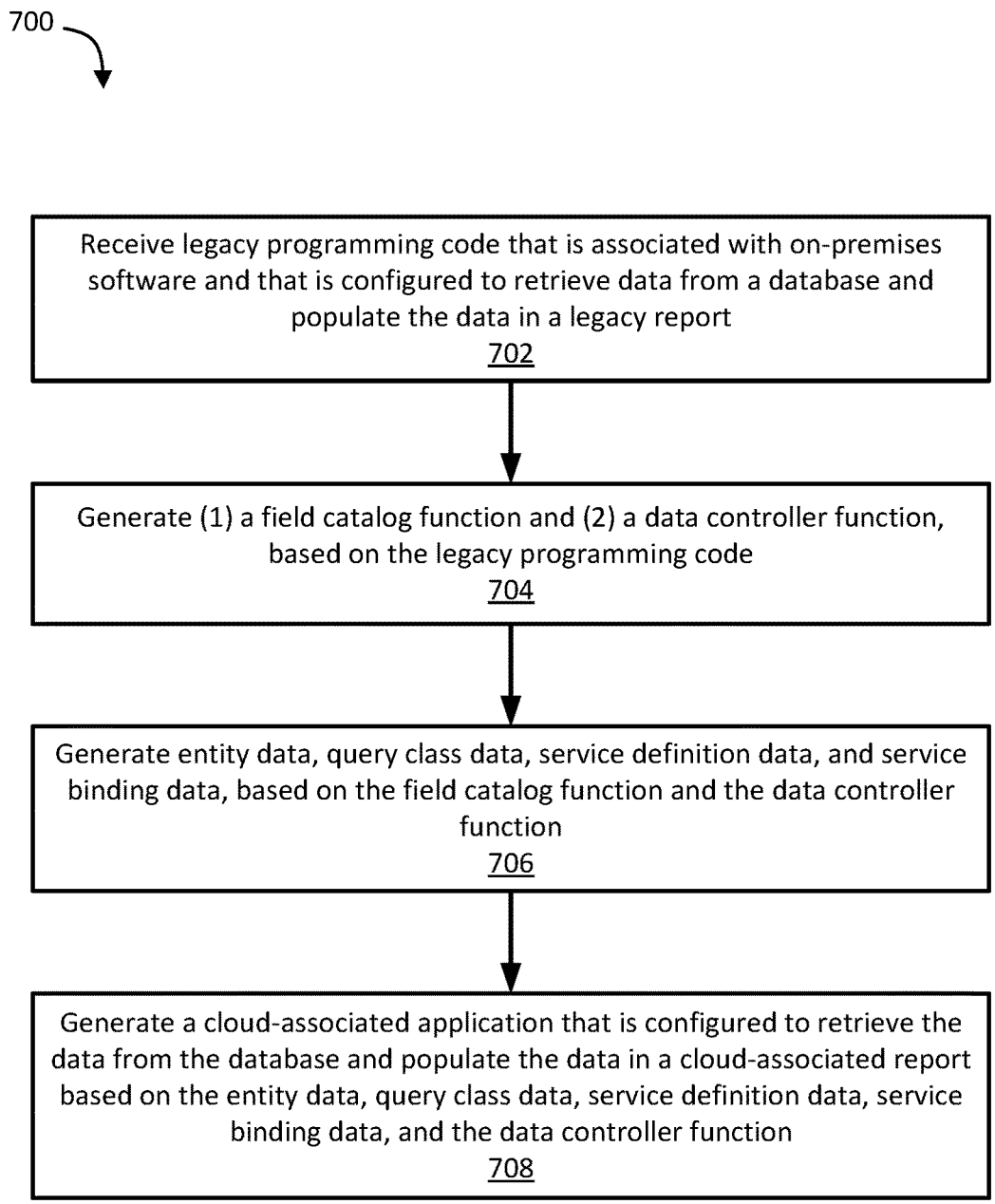
FIG. 7 is a flowchart showing a method of using a program generation system to generate, based on on-premises software operatively coupled to a database, a cloud-associated application operatively coupled to that database, according to an embodiment.

FIG. 7 is a flowchart showing a method 700 illustrating an example implementation using a program generation system to generate, based on on-premises software operatively coupled to a database, a cloud-associated application operatively coupled to that database, according to an embodiment. The method 700 can be implemented by a program generation system described herein (e.g., the program generation system 100 of FIG. 1). Portions of the method 700 can be implemented using a processor (e.g., the processor 220 of FIG. 2) of any suitable compute device (e.g., the compute device 110 and/or 120 of FIG. 1). The method 700 can include a method of generating a report generation program.

At 702, the method 700 includes receiving, via a processor, legacy programming code that is associated with on-premises software and that is configured to retrieve data from a database and populate the data in a legacy report. In some instances, the legacy programming code can be associated with ABAP, as described herein. At 704, the processor automatically generates (1) a field catalog function and (2) a data controller function, based on the legacy programming code. At 706, the processor automatically generates entity data, query class data, service definition data, and service binding data, based on the field catalog function and the data controller function. At 708, the method 700 generates a cloud-associated application that is configured to retrieve the data from the database and populate the data in a cloud-associated report based on the entity data, query class data, service definition data, service binding data, and the data controller function.

In an embodiment, a non-transitory processor-readable medium stores code representing instructions to be executed by one or more processors, the instructions including code to cause the one or more processors to receive first programming code associated with a legacy output that includes user-configurable data. The code also causes the one or more processors to generate, based on the first programming code, second programming code associated with a first function that outputs an indication of the user-configurable data. The code also causes the one or more processors to generate, based on the first programming code, third programming code associated with a second function that is configured to (1) receive a user input from a cloud-based application and (2) send the user-configurable data to the cloud-based application. The code also causes the one or more processors to generate entity data based on the second programming code. The code also causes the one or more processors to generate (1) query data based on the third programming code, and (2) service data based on the second programming code and the third programming code. The code also causes the one or more processors to generate fourth programming code that is associated with the cloud-based application and is configured to generate a cloud-based output that includes the user-configurable data based on the entity data, the query data, the service data, and the third programming code.

In some implementations, the fourth programming code can be configured to generate a remote function call associated with the third programming code to retrieve the user-configurable data to include in the cloud-based output. In some implementations, the service data can be associated with a service definition and a service binding. In some implementations, the service data can be associated with an Open Data protocol. In some implementations, the fourth programming code can include an SAP Fiori® tile and an SAP Fiori® list report. The SAP Fiori® tile can be configured to access the SAP Fiori® list report to cause the third programming code, via the service data, to retrieve the user-configurable data to be included in the cloud-based output. In some implementations, the legacy output can be associated with SAP® Advanced Business Application Programming (ABAP). In some implementations, the cloud-based output can be associated with an SAP® RESTful Application Programming Model (RAP).

In an embodiment, a method includes receiving, at a processor, executable code configured to generate first data that includes a first selection of second data based on a first user input. The method also includes generating, via the processor, in response to the receiving, and based on the executable code, (1) first function code that is associated with a first function and that is configured to generate third data that defines at least one field category, and (2) second function code that is associated with a second function and that is configured to populate at least a portion of the second data in the at least one field category. The method also includes generating, via the processor and in response to the generating the first function code, fourth data based on a first call to the first function code, the fourth data representing an entity that includes the second data and the third data. The method also includes generating, via the processor and in response to the generating the second function code, fifth data based on the second function code, the fifth data configured to define an application programming interface (API) that is configured to allow access to the fourth data by a cloud-based application in response to a second call to the second function code. The method also includes generating, via the processor and in response to the generating the fifth data, the cloud-based application. The cloud-based application is configured to, in response to a second user input, (1) use the API to automatically generate source code configured to generate a second call to the second function code, (2) execute the source code to retrieve a portion of the fourth data associated with a second selection of the second data, and (3) generate sixth data that includes the portion of the fourth data.

In some implementations, the executable code can be associated with an SAP® Advanced Business Application Programming (ABAP) report. In some implementations, the first function code can be associated with a first remote function module, the first call can include a first remote function call, the second function code can be associated with a second remote function module, and the second call can include a second remote function call. In some implementations, the fifth data can be associated with at least one of a custom entity, a query class, a service definition, or a service binding, associated with the cloud-based application. In some implementations, the fifth data can be associated with a RESTful programming artifact. In some implementations, the sixth data can be associated with an SAP Fiori® List report. In some implementations, the cloud-based application can be associated with an SAP Fiori® tile.

In an embodiment, a non-transitory processor-readable medium stores code representing instructions to be executed by one or more processors, the instructions including code to cause the one or more processors to receive legacy programming code that is associated with on-premises software and that is configured to retrieve data from a database and populate the data in a legacy report. The code also causes the one or more processors to generate (1) a field catalog function and (2) a data controller function, based on the legacy programming code. The code also causes the one or more processors to generate entity data, query class data, service definition data, and service binding data, based on the field catalog function and the data controller function. The code also causes the one or more processors to generate a cloud-associated application that is configured to retrieve the data from the database and populate the data in a cloud-associated report based on the entity data, query class data, service definition data, service binding data, and the data controller function.

In some implementations, the legacy programming code can be unassociated with a cloud service. In some implementations, the query class data can be configured to generate source code based on at least one of a request from the cloud-associated application or a response from the cloud-associated application, and the source code can be configured to call the data controller function. In some implementations, the cloud-associated application is associated with SAP Fiori®. In some instances, the entity data can be configured to cause the cloud-associated report to include at least one of a filter criterion or a selection criterion based on the cloud-associated report. In some implementations, the service binding data can be associated with a representational state transfer application programming interface (API).

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed:

1. A non-transitory processor-readable medium storing code representing instructions to be executed by one or more processors, the instructions comprising code to cause the one or more processors to: receive first programming code associated with a legacy output that includes user-configurable data; generate, based on the first programming code, second programming code associated with a first function that defines a field category associated with the user-configurable data; generate, based on the first programming code, third programming code associated with a second function that is configured to (1) receive a user input from a cloud-based application, (2) generate a first function call associated with the first function to populate the field category with the user-configurable data, and (3) send the user-configurable data to the cloud-based application; and generate, based on the second programming code and the third programming code, fourth programming code that is associated with the cloud-based application and is configured to generate a second function call that is (1) associated with the second function and (2) configured to generate a cloud-based output that includes the user-configurable data.

2. The non-transitory processor-readable medium of claim 1, wherein the fourth programming code is configured to generate a remote function call associated with the third programming code to retrieve the user-configurable data to include in the cloud-based output.

3. The non-transitory processor-readable medium of claim 1, further storing instructions to cause the one or more processors to generate service data based on the second programming code and the third programming code, the service data being associated with a service definition and a service binding.

4. The non-transitory processor-readable medium of claim 3, wherein the service data is associated with an Open Data protocol.

5. The non-transitory processor-readable medium of claim 3, wherein the fourth programming code includes an SAP Fiori® tile and an SAP Fiori® list report, the SAP Fiori® tile configured to access the SAP Fiori® list report to cause the third programming code, via the service data, to retrieve the user-configurable data to be included in the cloud-based output.

6. The non-transitory processor-readable medium of claim 1, wherein the legacy output is associated with SAP® Advanced Business Application Programming (ABAP).

7. The non-transitory processor-readable medium of claim 1, wherein the cloud-based output is associated with an SAP® RESTful Application Programming Model (RAP).

8. A method comprising:
receiving, at a processor, executable code configured to generate first data that includes a first selection of second data based on a first user input;
generating, via the processor, in response to the receiving, and based on the executable code, (1) first function code that is associated with a first function and that is configured to generate third data that defines at least one field category, and (2) second function code that is associated with a second function and that is configured to populate at least a portion of the second data in the at least one field category;
generating, via the processor and in response to the generating the first function code, fourth data based on a first call to the first function code, the fourth data representing an entity that includes the second data and the third data;
generating, via the processor and in response to the generating the second function code, fifth data based on the second function code, the fifth data configured to define an application programming interface (API) that is configured to allow access to the fourth data by a cloud-based application in response to a second call to the second function code; and
generating, via the processor and in response to the generating the fifth data, the cloud-based application that is configured to, in response to a second user input:
use the API to automatically generate source code configured to generate a second call to the second function code;
execute the source code to retrieve a portion of the fourth data associated with a second selection of the second data; and
generate sixth data that includes the portion of the fourth data.

9. The method of claim 8, wherein:
the executable code is associated with an SAP® Advanced Business Application Programming (ABAP) report.

10. The method of claim 8, wherein:
the first function code is associated with a first remote function module;
the first call includes a first remote function call;
the second function code is associated with a second remote function module; and
the second call includes a second remote function call.

11. The method of claim 8, wherein the fifth data is associated with at least one of a custom entity, a query class, a service definition, or a service binding, associated with the cloud-based application.

12. The method of claim 8, wherein the fifth data is associated with a RESTful programming artifact.

13. The method of claim 8, wherein the sixth data is associated with an SAP Fiori® List report.

14. The method of claim 8, wherein the cloud-based application is associated with an SAP Fiori® tile.

15. A non-transitory processor-readable medium storing code representing instructions to be executed by one or more processors, the instructions comprising code to cause the one or more processors to:
receive legacy programming code that is associated with on-premises software and that is configured to retrieve data from a database and populate the data in a legacy report;
generate (1) a field catalog function and (2) a data controller function configured to generate a first function call to the field catalog function, based on the legacy programming code; and
generate, based on the field catalog function and the data controller function, a cloud-associated application that is configured to retrieve the data from the database and populate the data in a cloud-associated report by generating a second function call to the data controller function.

16. The non-transitory processor-readable medium of claim 15, wherein the legacy programming code is not associated with a cloud service.

17. The non-transitory processor-readable medium of claim 15, further storing instructions to cause the one or more processors to:
generate, based on the field catalog function and the data controller function, query class data configured to generate source code in response to at least one of a request from the cloud-associated application or a response from the cloud-associated application, the source code being configured to call the data controller function.

18. The non-transitory processor-readable medium of claim 15, wherein the cloud-associated application is associated with SAP Fiori®.

19. The non-transitory processor-readable medium of claim 15, further storing instructions to cause the one or more processors to generate, based on the field catalog function and the data controller function, entity data configured to cause the cloud-associated report to include at least one of a filter criterion or a selection criterion based on the cloud-associated report.

20. The non-transitory processor-readable medium of claim 15, further storing instructions to cause the one or more processors to generate, based on the field catalog function and the data controller function, service binding data associated with a representational state transfer application programming interface (API).

* * * * *